United States Patent
Liao

(10) Patent No.: US 9,961,421 B2
(45) Date of Patent: May 1, 2018

(54) MICROPHONE STAND ADJUSTING STRUCTURE

(71) Applicant: GAO FONG YI INDUSTRIAL CO., LTD., Taichung (TW)

(72) Inventor: Chi-Ching Liao, Taichung (TW)

(73) Assignee: GAO FONG YI INDUSTRIAL CO., LTD., Taichung (TW)

( * ) Notice: Subject to any disclaimer, the term of this patent is extended or adjusted under 35 U.S.C. 154(b) by 0 days. days.

(21) Appl. No.: 15/168,103

(22) Filed: May 30, 2016

(65) Prior Publication Data

US 2017/0347170 A1    Nov. 30, 2017

(51) Int. Cl.
| | |
|---|---|
| *F16M 11/24* | (2006.01) |
| *H04R 1/02* | (2006.01) |
| *F16M 11/18* | (2006.01) |
| *F16M 11/28* | (2006.01) |

(52) U.S. Cl.
CPC ............ *H04R 1/02* (2013.01); *F16M 11/18* (2013.01); *F16M 11/245* (2013.01); *F16M 11/28* (2013.01); *F16M 2200/027* (2013.01); *H04R 2201/025* (2013.01)

(58) Field of Classification Search
CPC ........ H04R 1/02; F16M 11/18; F16M 11/245; F16M 11/28; F16M 2200/027; F16M 2201/025
USPC ...... 248/404, 188.7, 188.1, 188.5, 132, 161, 248/157, 439, 440.1, 431, 163.1, 443, 248/448, 449, 441.1
See application file for complete search history.

(56) References Cited

U.S. PATENT DOCUMENTS

| | | | | |
|---|---|---|---|---|
| 4,047,684 A * | 9/1977 | Kobayashi | ............... | G10G 5/00 248/122.1 |
| 4,697,773 A * | 10/1987 | Jaumann | ................... | F16F 9/36 248/162.1 |
| 4,706,916 A * | 11/1987 | Cullmann | ............. | F16B 7/1463 248/168 |
| 5,377,942 A * | 1/1995 | Knopp | .................. | F16F 9/0245 248/161 |
| 5,857,657 A * | 1/1999 | Yamamoto | ............. | F16M 11/28 248/406.1 |
| 6,007,032 A * | 12/1999 | Kuo | ........................ | F16M 11/10 248/125.1 |
| 6,182,583 B1 * | 2/2001 | Larson | ..................... | A47B 9/10 108/147 |
| 6,336,624 B1 * | 1/2002 | Kulhavy | ................... | F16F 9/36 188/300 |
| 8,146,876 B1 * | 4/2012 | Young | .................... | F16B 7/1409 248/161 |
| 8,162,271 B2 * | 4/2012 | Li | ......................... | F16M 11/04 248/162.1 |
| 2011/0167986 A1 * | 7/2011 | Hennessey | ............. | G10D 13/06 84/453 |

(Continued)

*Primary Examiner* — Nkeisha Smith
(74) *Attorney, Agent, or Firm* — Leong C. Lei

(57) ABSTRACT

A microphone stand structure allows an upper frame rod to be elevated automatically for adjustment to a proper elevation after a locking seat is released. A pressure rod is received and mounted in a hollow main frame rod and includes an extensible member having a top end supporting a bottom end of the upper frame rod movably inserted into the hollow main frame rod such that the whole stand height can be selectively fixed simply locking the locking seat.

2 Claims, 4 Drawing Sheets

(56) References Cited

U.S. PATENT DOCUMENTS

| | | | |
|---|---|---|---|
| 2014/0151527 A1* | 6/2014 | Sawhney | F16M 11/242 248/542 |
| 2015/0102187 A1* | 4/2015 | Hennessey | F16M 11/10 248/122.1 |
| 2016/0053934 A1* | 2/2016 | Hennessey | F16M 11/28 248/124.2 |
| 2016/0084431 A1* | 3/2016 | Chen | F16M 11/28 307/43 |
| 2016/0091134 A1* | 3/2016 | May | F16M 11/28 248/404 |

\* cited by examiner

MICROPHONE STAND ADJUSTING STRUCTURE

TECHNICAL FIELD OF THE INVENTION

The present invention relates to a microphone stand adjusting structure, and more particularly to a microphone stand lifting structure capable of the convenient placement of a microphone and the arbitrary adjustment of the height thereof.

DESCRIPTION OF THE PRIOR ART

Conventional microphone stands are generally divided into single tube typed stand and double tube typed stand constituted by a upper tube inserted in a lower tube and being extensible to change an assembly height, the latter being more popular. The double tube typed stands are configured with a fixing seat in the middle thereof for the locking upon the extension or contraction adjustment thereof so as to adjust the height of the whole stand, thereby to be in response to a user's height so as to achieve sound receiving convenience and sound effect assurance. However, since the structure thereof are too simple and the assembled stand is too long, the inner tube being extended from or inserted into the outer tube usually is not smooth upon the extension or contraction adjustment. Especially, longer insertion assembly will cause shaking such that it is difficult to be used in important occasions or performances. To overcome the defects mentioned above, tripod structure for the stable placement of a musical instrument, such as Taiwan Patent No. M267586, titled "adjustable musical instrument tripod", are developed. The patent mentioned above uses the separate support of the equally spaced support rods of the bottom tripod seat operated in coordination with the configuration of the central main rod to carry out the vertical adjustment of the musical instrument accepting rod by means of the collapsing adjustment of the main support rod, thereby achieving a musical instrument placement stabilization effect. However, the locking and releasing operations thereof are very minute and complicated upon adjustment such that it is not possible for the tripod to be adjusted in the middle of a performance; it may be a secure design, but not suitable for use in a performance in which the placement height of a microphone is always needed to change timely according to the heights and postures of performers.

SUMMARY OF THE INVENTION

To overcome the defects of the conventional microphone stand mentioned above, which are inconvenient and unpractical in use and adjustment, the present invention is proposed.

The main object of the present invention is to provide a microphone stand structure, allowing an upper frame rod to be elevated automatically and adjusted, extended to a proper elevation, after a locking seat is released, by an extensible pressure rod arranged in a hollow main frame rod, and the whole stand height can be fixed simply by locking the locking seat, thereby achieving the convenience, practicality and security of microphone placement and stand adjustment.

DETAILED DESCRIPTION OF THE PREFERRED EMBODIMENTS

Figure 1:
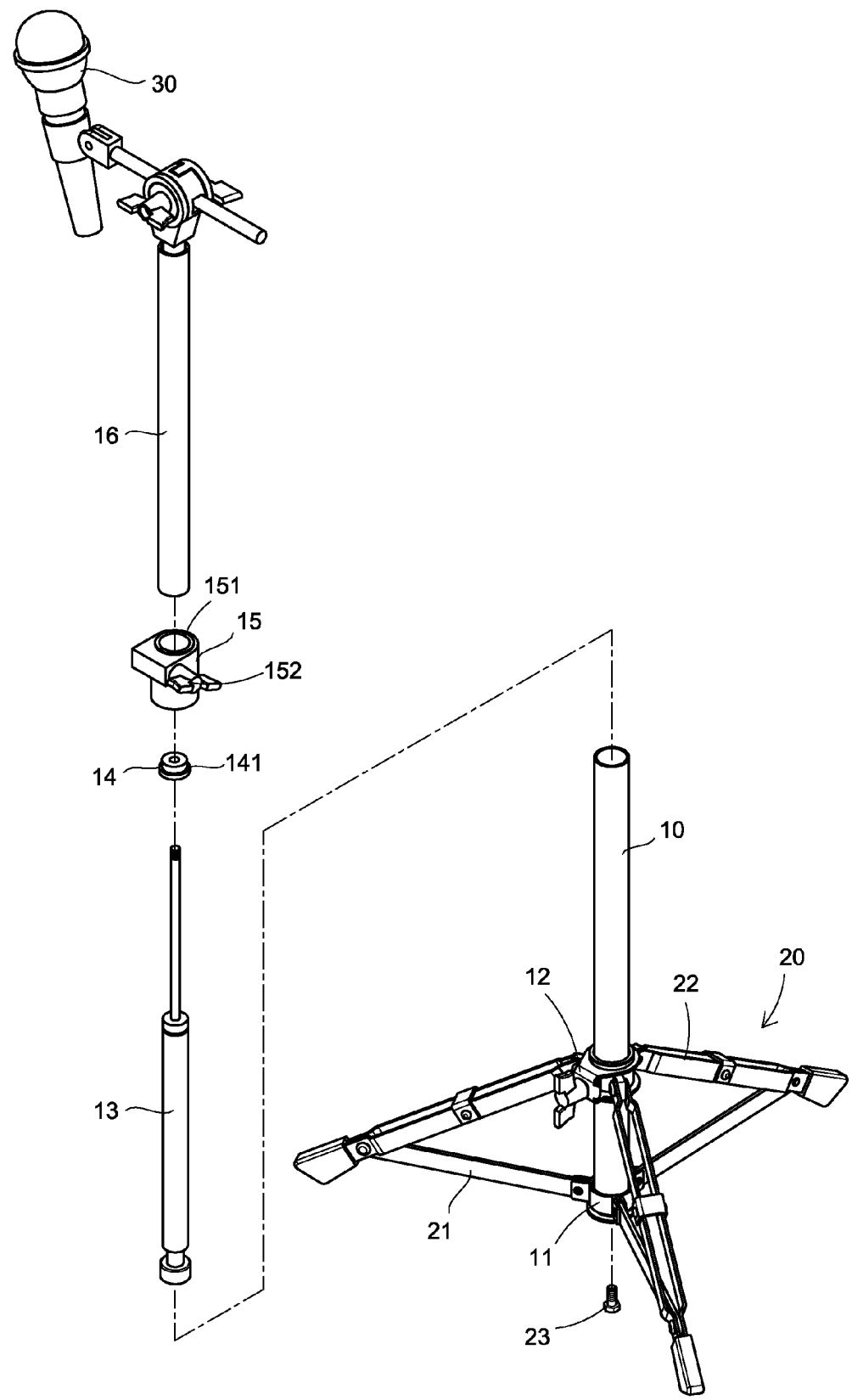
FIG. 1 is an exploded view of a microphone stand structure of the present invention.
Figure 2:
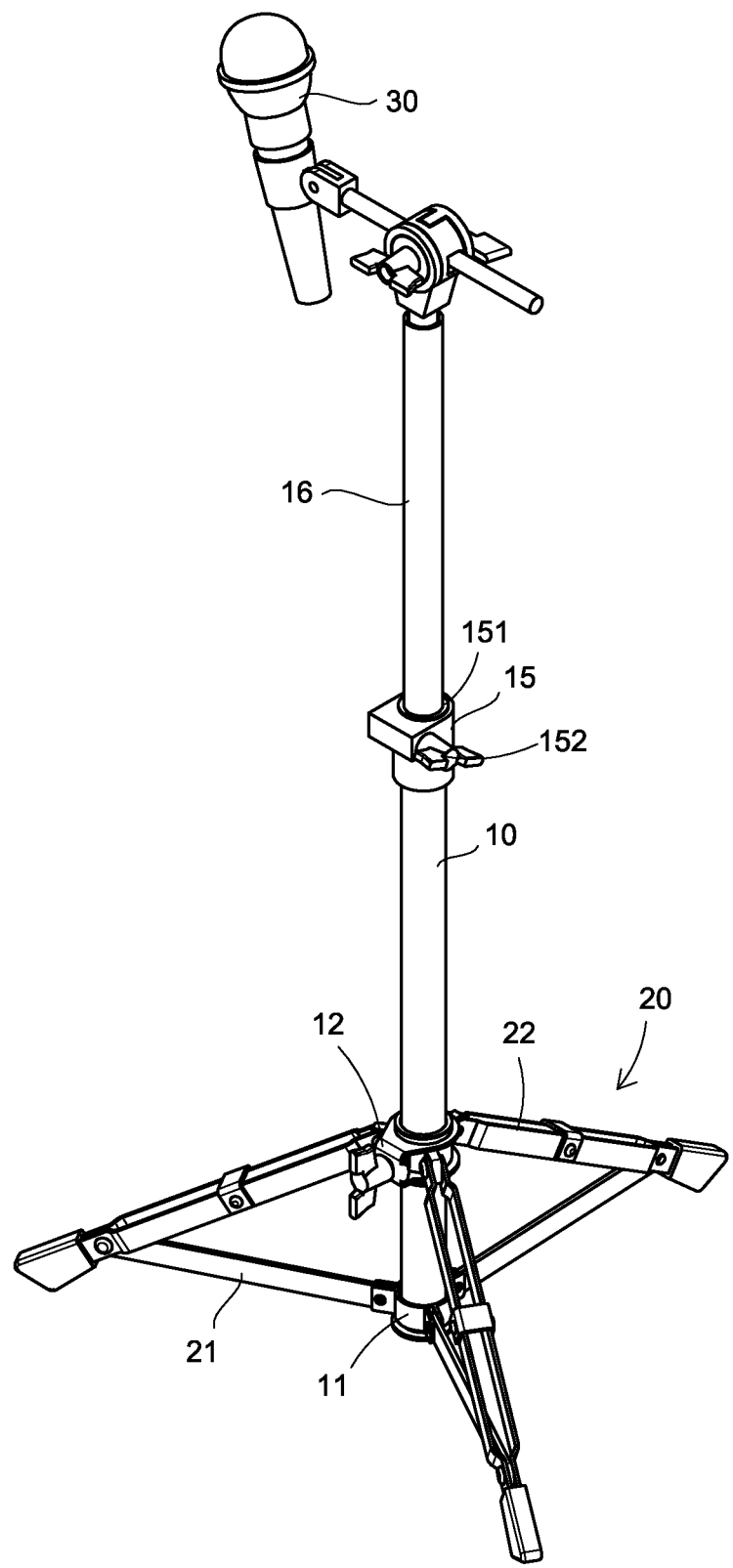
FIG. 2 is a perspective view of a microphone stand structure of the present invention.
Figure 3:
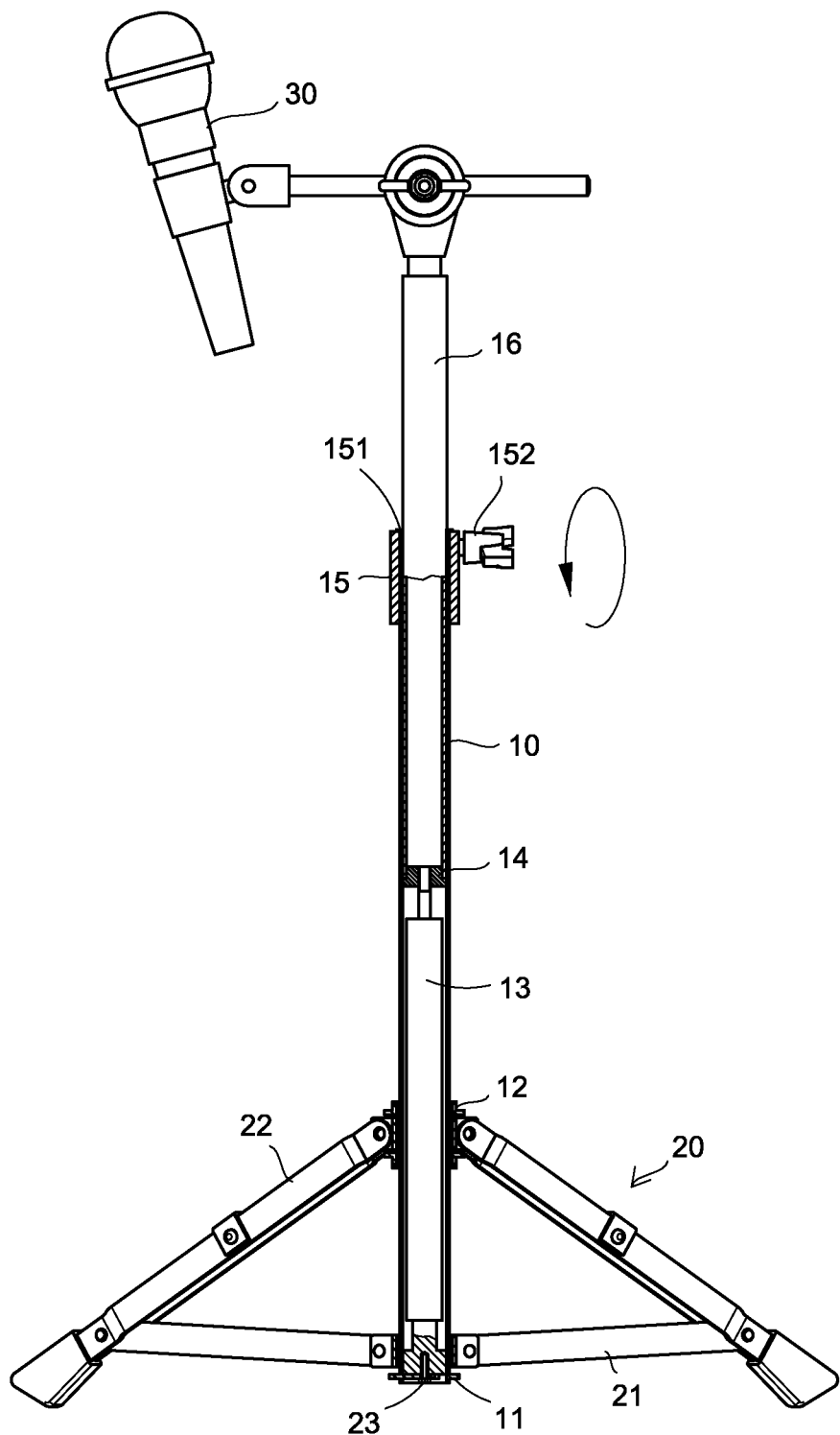
FIG. 3 is a schematic view of a microphone stand structure of the present invention upon the reduction of the height thereof.
Figure 4:
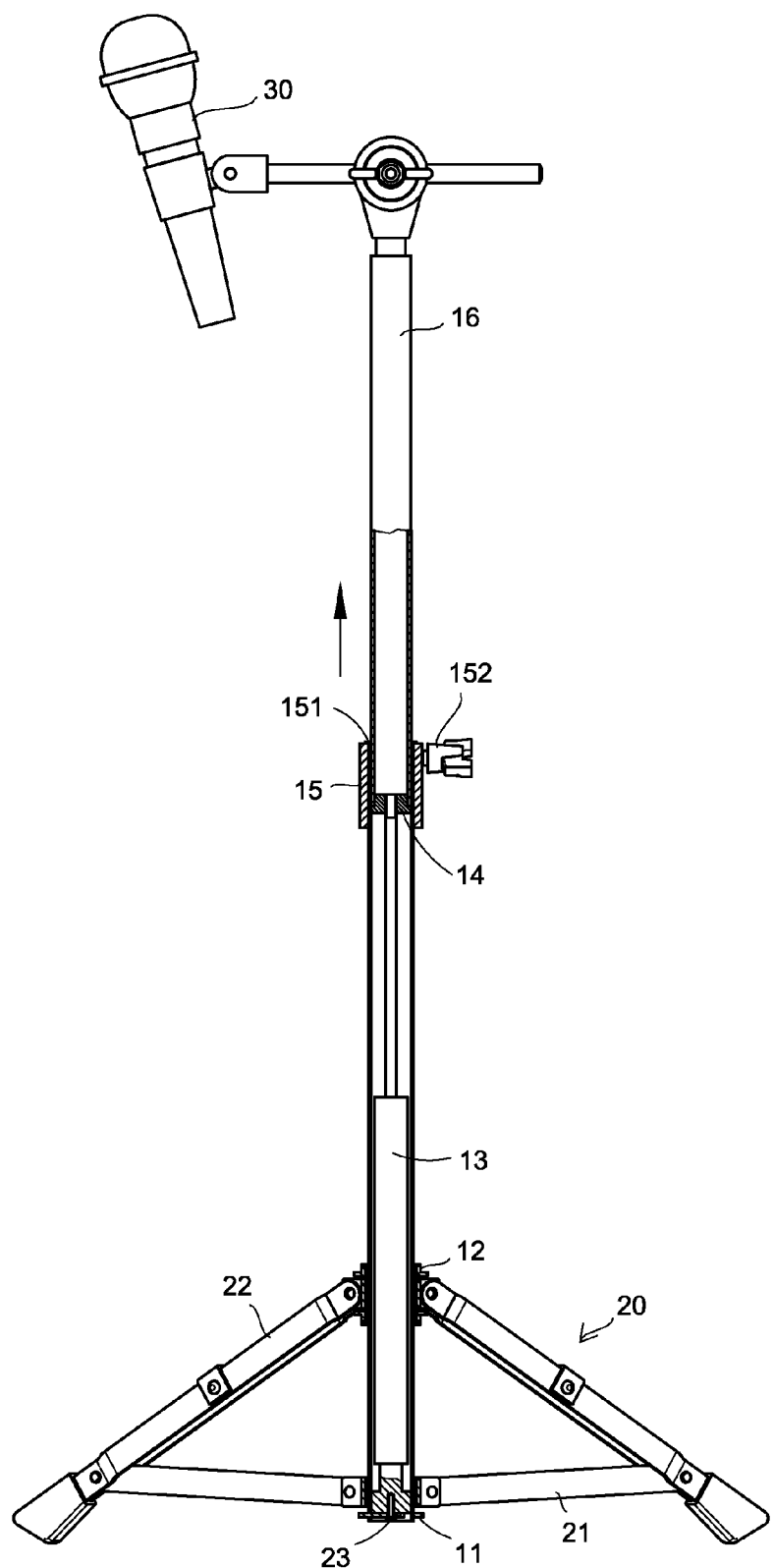
FIG. 4 is a schematic view of a microphone stand structure of the present invention upon the increasing of the height thereof.

The present invention is a microphone stand adjusting structure, mainly setting a support stand for the placement and use of a microphone into two-part telescopically adjustable structure. Referring to FIGS. 1 to 4, the structure includes: a hollow tubular main frame rod 10; and a tripod set 20, adapted to support collapsible operating frames and locked to the bottom of the main frame rod 10, and having collapsible enforced linkages 21 in connection with the peripheral of a central base 11 and in equal connection with respective tripod rods 22, where ends of the tripod rods 22 are respectively coupled pivotally equally to the outer peripheral of the fixing seat ring 12, thereby allowing the collapsing operation of the tripod set 20. Furthermore, the hollow main frame rod 10 extends through the fixing seat ring 12 to insert in and assemble on the central base 11, thereby being locked and connected integrally thereto. Thereupon, the collapsing angle of the supporting tripod can be adjusted properly and a microphone supporting height can be changed together with a tripod grounding area by changing the position of the main frame rod 10 locked by the fixing seat ring 12. Furthermore, a pressure rod 13, which has a movable member capable of telescopic operation, is fixed on the bottom inside the hollow main frame rod 10, and the bottom end of the rod 13 is locked directly from the outside of the bottom generally by a bolt 23 to the central base 11 that is mounted to the bottom of the main frame rod 10. Furthermore, the top end of the movable member of the pressure rod 13 is locked with a disc seat 14, When and an outer rim of the disc seat has an indented stepped annular groove 141, and a top rim of the hollow main frame rod 10 is configured with a locking seat 15; a plastic cover 151 is configured on and inner annular surface of the locking seat 15; a locking lever 152 configured on one side of the locking seat 15 allows the plastic cover 151 inside the locking seat 15 to control locking and loosing of the plastic cover 151 for collapsing purposes. Putting the locking seat 15 around the top end of the main frame rod 10 may limit the highest extended position of the disc seat 14 on the top end of the pressure lever 13, making it not go beyond the bottom end of the locking seat 15. Furthermore, the bottom end of an upper frame rod 16 is propped against and positioned on the stepped annular groove 141 of the disc seat 14 after the upper frame rod 16 is inserted in the main frame rod 10, thereby keeping an overlapping insertion of a considerable depth with the locking seat 15. Thereafter, the locking seat 15 can be used to clamp the upper frame rod 16 properly, achieving assembly and use safety and stabilization. This mutual contact assembly allows the upper frame rod 16 to be pushed high quickly by the extension of the pressure rod 13 to increase the placement height of the microphone 30 quickly to achieve the change control of the whole supporting height after the upper frame rod 16 is released from the locking seat 15, and a user's hand will not hold the upper frame rod 16 until the upper frame rod 16 is extended to a proper position and, at the same time, the locking seat 15 may be locked tight so as to fix the assembly length of the whole stand. When the assembly length is too long and needs to be shortened, only pressing the upper frame rod 16 downward reversely is enough and the movable member of the pressure rod 13 inside the hollow frame rod 10 can be pressed down simply and smoothly. Because the bottom end of the upper frame rod 16 is positioned by the disc seat 14 and middle part thereof is sliding due to the locking seat 15, the bottom end is fixed and the middle part is displaced in a way of touching the plastic cover 151 upon the extension of the upper frame rod 16 so as to achieve a smooth effect without shaking and to be very convenient for control. Furthermore, only the locking and loosing of the locking seat 15 can achieve the positioning simply and, because the whole assembly structure and outlook is similar to conventional tripod sets for the placement of a microphone, only the assistance of the extensible pressure rod 13 inside the hollow main frame rod 10 and the locking and loosing of the locking seat 15 are needed to adjust the use height of a microphone 30, thereby achieving a fast, extension-stable and safe effect.

The microphone stand adjusting structure of the present invention is characterized in that the pressure rod 13 is fixed inside the hollow inner bottom of the main frame rod 10, a movable member of the pressure rod 13 can be extended out stably, quickly and automatically with pressure, achieving an effect of pushing the upper frame rod 16 upward to extend out a proper length above the main frame rod 10, allowing a microphone 30 or other musical instrument placed on the top of the upper frame rod 16 to be displaced upward quickly and automatically. Furthermore, when the extension of the upper frame rod 16 is adjusted, with the locking seat 15 loosed, the upper frame rod 16 can be driven upward automatically simply by the push of the pressure rod 13 located inside the main frame rod 10 to slide smoothly with respect to the main frame rod 10, and afterwards, only the locking seat 15 is needed to lock again to secure the upper frame rod 16 when the microphone reaches the position of a required height; if the upper frame rod 16 is extended out too high, the locking seat 15 is loosed again and the upper frame rod 16 can then be pressed down reversely to contract into the main frame rod 10 and, thereafter, the locking seat 15 can then be locked tight when the microphone reaches the position of a proper height, thereby achieving the accurate positioning of the microphone. In addition, because the middle part of the upper frame rod 16 is slid stably in contact with the plastic cover 151 of the locking seat 15 and the accurate propping of the bottom end of the upper frame rod 16 against the disc seat 14 upon the vertical displacement of the upper frame rod 16, the stable sliding thereof can be carried out accurately without shaking and causing security concerns.

I claim:

1. A microphone stand adjusting structure, comprising: a tripod set, which comprises a combination of tripod rods, links, a central base and a fixing seat ring to from a collapsible body; a hollow main frame rod, which is in connection with a center of said tripod set; and a pressure rod, received and mounted in said main frame rod and comprising a movable member that is adapted to support a musical instrument in a movable manner, wherein the pressure rod is fixed on a bottom inside said hollow main frame rod and has a bottom end of the main frame rod locked to the central base mounted to said main frame rod, a top end of the movable member of a pressure-rod is coupled to a disc seat such that the disc seat is movable in unison with the movable member of the pressure rod, a locking seat is mounted on a top end of said main frame rod-to define a highest extension position of said disc seat on said movable member of said pressure rod; an upper frame rod is partly and movable inserted into the hollow main frame rod and a bottom end of said upper frame rod is propped against said disc seat when said upper frame rod is inserted in said main frame rod, thereby making said upper frame rod contacting and positioning and keeping a fair depth of overlapping with said main frame rod, and said locking seat is selectively locked to position said upper frame rod, achieving use safety and stability of a assembly; said upper frame rod is pushed by a pressure lever to extend and heighten a whole assembly quickly at same time when said locking seat is loosed such that a length of said whole assembly is adjusted quickly and simply through locking, loosing and positioning of said locking seat, wherein the pressure rod is received and concealed in the hollow main frame rod with the highest extension position of the disc seat mounted on the movable member of the pressure rod confined within the hollow main frame rod by the locking seat mounted to the top end of the main frame rod, the locking and positioning of a bottom end of said pressure lever is carried out directly by a bolt from outside a bottom of said pressure lever, and a plastic cover is covered on an inner face of said locking seat, and collapsing control of said plastic cover inside is carried out by locking or releasing of a locking lever configured on one side of said locking seat.

2. The structure according to claim 1, wherein an outer peripheral of said disc seat is indented with a staged annular groove adapted to position said bottom end of said upper frame rod after being inserted in said main frame rod.

* * * * *